United States Patent
Dimitriou et al.

(10) Patent No.: US 6,560,653 B1
(45) Date of Patent: May 6, 2003

(54) SYSTEM AND METHOD FOR PROCESSING A SIGNALLING MESSAGE IN AN ATM NETWORK

(75) Inventors: Andreas Dimitriou, Bandhagen (SE); Hans Hedin, Taby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/485,229

(22) PCT Filed: Aug. 6, 1998

(86) PCT No.: PCT/EP98/04911

§ 371 (c)(1),
(2), (4) Date: Apr. 17, 2000

(87) PCT Pub. No.: WO99/08472

PCT Pub. Date: Feb. 18, 1999

(30) Foreign Application Priority Data

Aug. 8, 1997 (GB) .............................................. 9716861

(51) Int. Cl.[7] .............................................. G06F 15/16
(52) U.S. Cl. ........................................ 709/236; 714/799
(58) Field of Search ................................ 709/206, 207, 709/303, 314, 236; 714/807, 799, 752, 48, 822, 797

(56) References Cited

U.S. PATENT DOCUMENTS

| 5,163,057 A | | 11/1992 | Grupp ........................ 714/798 |
| 5,388,109 A | | 2/1995 | Hodge et al. ................ 714/807 |
| 5,621,759 A | * | 4/1997 | King ............................ 375/240 |
| 5,652,783 A | | 7/1997 | Keba et al. .................. 370/313 |
| 5,768,533 A | * | 6/1998 | Ran ............................. 709/247 |
| 6,032,197 A | * | 2/2000 | Birdwell et al. ............ 709/247 |
| 6,088,826 A | * | 7/2000 | Teich .......................... 714/774 |
| 6,381,241 B1 | * | 4/2002 | Ghirnikar et al. ........... 370/394 |

FOREIGN PATENT DOCUMENTS

| EP | 0106985 | 5/1984 |
| EP | 0445730 | 9/1991 |
| EP | 0516042 | 12/1992 |
| GB | 1188193 | 4/1970 |
| JP | 05-37544 | 6/1993 |
| JP | 08-114915 | 8/1993 |
| JP | 06-37786 | 5/1994 |
| JP | 06-350635 | 12/1994 |
| JP | 07-95201 | 4/1995 |
| JP | 07-131461 | 5/1995 |
| JP | 07-162431 | 6/1995 |
| JP | 07-202907 | 8/1995 |
| JP | 08-251184 | 9/1996 |
| WO | 93/15502 | 8/1993 |

OTHER PUBLICATIONS

Patent Abstracts of Japan—No. 56158552, Dec. 7, 1981; Inventor: Nomura Masayuki; vol. 6, No. 42.
XP 000458697—"ATM–Based Signaling Network Topics on Reliability and Performance"; IEEE Journal on Selected Areas in Communications; Apr. 12, 1994; vol. 12, No. 3, pp. 517–525.
Patent Abstracts of Japan—No. 09018507, Jan. 1, 1997; Inventor: Sato Motonori; Vo. 97, No. 5.

* cited by examiner

Primary Examiner—Glenton B. Burgess
Assistant Examiner—Kimberly Flynn

(57) ABSTRACT

There is disclosed a network node, and a method of operation thereof, for use in, for example, an ISDN network. The node receives messages which include mandatory elements (without which the message cannot be processed), and optional elements (without which the message may still be processed). The mandatory elements are decoded and checked for errors and, only if they are present and error-free are the optional elements decoded and checked for errors.

4 Claims, 2 Drawing Sheets

SYSTEM AND METHOD FOR PROCESSING A SIGNALLING MESSAGE IN AN ATM NETWORK

TECHNICAL FIELD OF THE INVENTION

This invention relates to a control system for use in a network, and more particularly an ISDN data and telecommunications network.

DESCRIPTION OF RELATED ART

The invention relates in specific embodiments thereof to the B-ISDN user-network protocol Q.2931, as standardized by the ITU-T.

This protocol specifies the required form of each message, and a control system at a network node must be able to decode an incoming signalling message and then perform error checking. The required error checks are specified in Chapter 5.6 of the Q.2931 specification.

Thus, in accordance with the prior art, the incoming stream of bits which represents the signalling message is decoded and converted into a particular format, and error checking is then performed.

SUMMARY OF THE INVENTION

An incoming signalling message will consist of a number of different components, some of which are essential, that is they must be present for the message to be able to be processed at all, and others of which are optional, that is the message can be processed even if those elements are not present. However, in accordance with the prior art, it is necessary to decode the whole of each incoming message, before performing error checking. If one or more of the essential message components is absent or contains an error, the computational effort required to decode the remaining elements of the message will have been wasted.

In embodiments of the present invention, therefore, the message is decoded in stages. More specifically, the elements which must be present can be decoded and checked for errors before the optional elements are decoded. Then, if there is an error in one of the compulsory elements, or if such an element is missing entirely, it will not have been necessary to decode the remainder of the message.

This has the advantage that less computational effort is wasted on messages which cannot be processed.

DETAILED DESCRIPTION OF PREFERRED EMBODIMENTS

Figure 1:
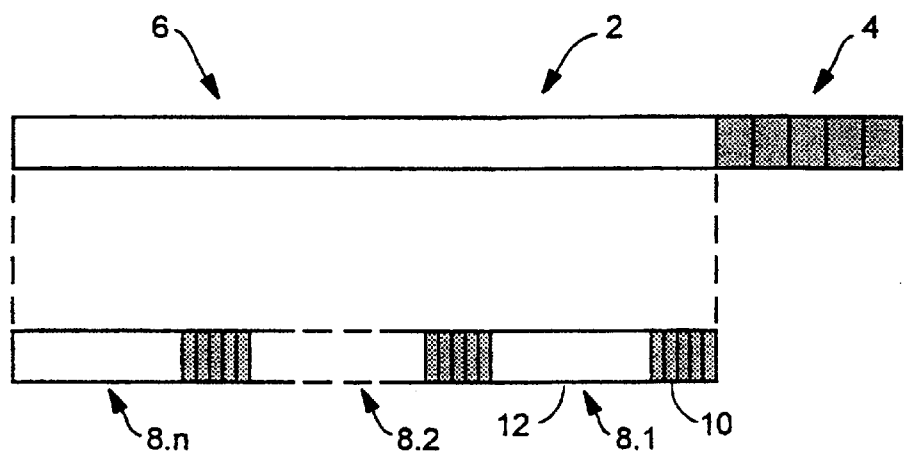
FIG. 1 is a representation of a message in accordance with a particular signalling protocol.

FIG. 1 shows a message 2 in accordance with the Asynchronous Transfer Mode (ATM) User Network Interface (UNI) signalling protocol, used in the B-ISDN network. Each message 2 is made up of a message head 4 and a message body 6. The message head 4 contains data which acts as: a protocol discriminator; a call reference; an indication of the message type, including a message compatibility instruction indicator; and an indication of the message length. In accordance with the protocol, each of these elements must be present in every valid message. Moreover, each of these components of the message head has a fixed size.

The message body 6 is made up of a number of information elements 8.1, 8.2, ..., 8.n. For example, there may be up to 30 such information elements in a single message, and the order of arrival of these information elements is irrelevant.

In the ATM UNI signalling protocol, each information element 8 is made up of an information element head 10 and an information element body 12. Each information element head 10 includes: an information element identifier; an information element instruction field; and an indication of the length of the contents of the information element.

Some of these information elements are mandatory, that is the message may not be processed unless these information elements are present. For example, these elements may be absent, or may contain errors which make them unprocessable, if received from a faulty or incompatible terminal. Other information elements are optional, that is, if there is an error in one of these information elements, then the message should still be processed. In a typical message, the optional elements might have a length five times that of the mandatory elements.

Figure 2:
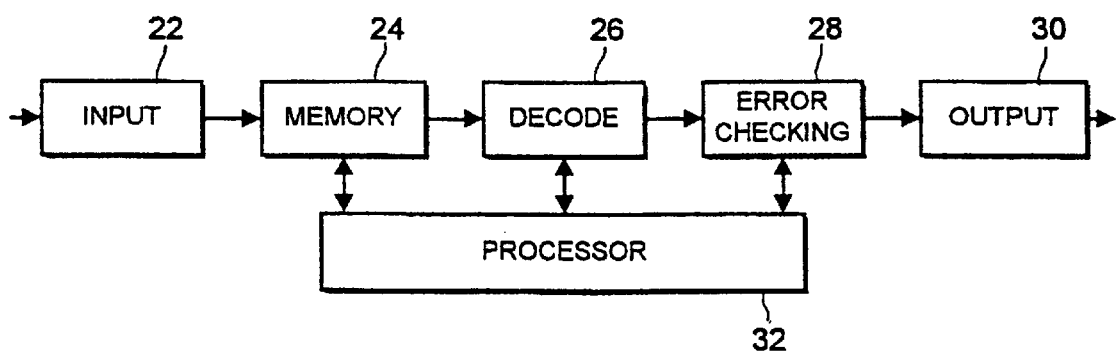
FIG. 2 is a block schematic diagram of a network node in accordance with one aspect of the invention.

FIG. 2 is a schematic representation of a network access node embodying the present invention. Received signalling messages are supplied to an input device 22, and then to a memory 24, where they are stored. From the memory 24, data can be sent to a decoding device 26, and then to an error checking device 28 and an output device 30, the memory 24, decoding device 26 and error checking device 28 being under the control of a processor 32.

Figure 3:
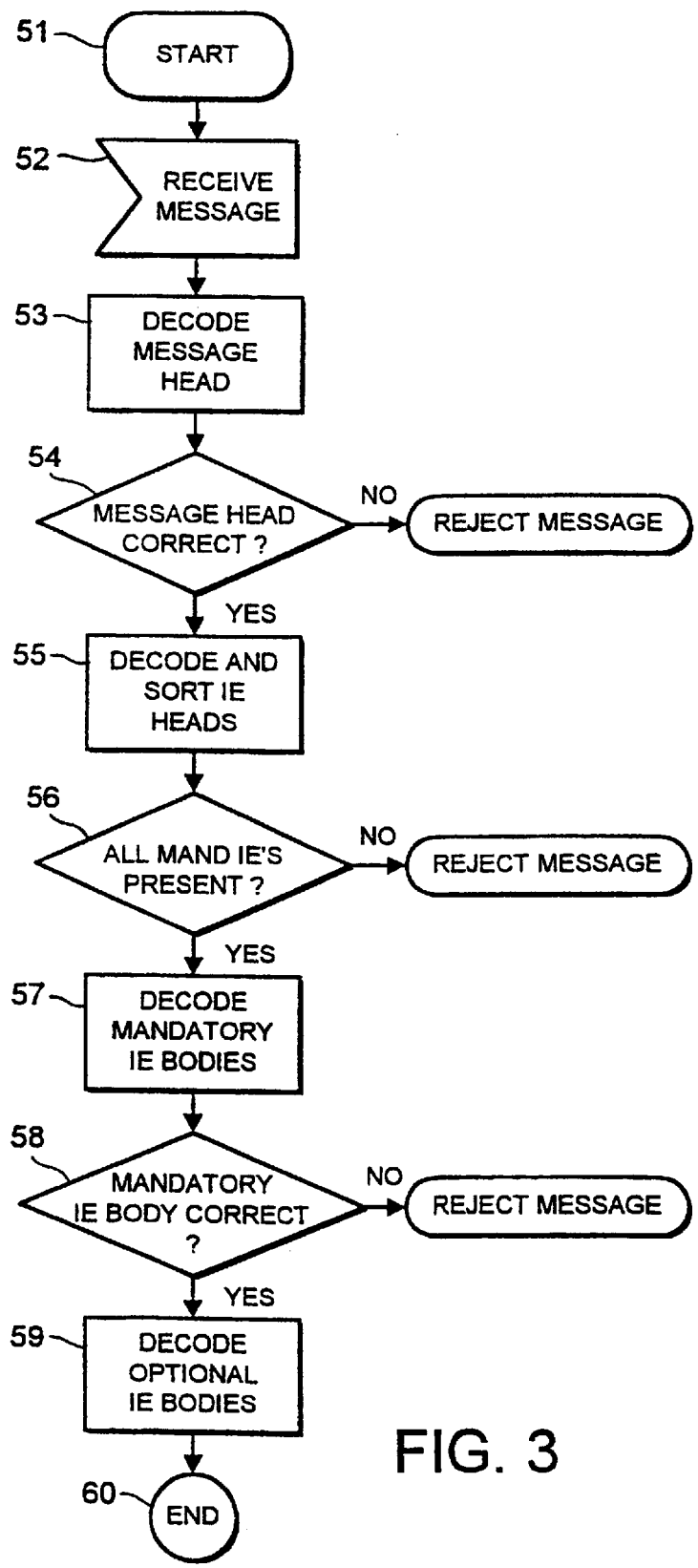
FIG. 3 is a flow chart illustrating a method in accordance with another aspect of the invention.

The form of the input device 22, memory 24, decoding device 26, error checking device 28 and output device 30 are not described further, because they are generally conventional. Moreover, the processor 32 is of a generally conventional type, but is programmed to handle incoming signalling messages in accordance with a procedure described in more detail with reference to FIG. 3. In the procedure of FIG. 3, the first step, step 51 is the start. At step 52, an incoming signalling message is received in the input device 22 and memory 24. Under the control of the processor 32, the data representing the message head are sent to the decoding device 26 and decoded, in step 53 of the procedure in FIG. 3. The decoded message head is sent in step 54 to the error checking device 28, which performs error checking according to the standards set out in paragraphs 5.6.1–5.6.5 in the ITU-T Q.2931 protocol. If the message head is correct, it can be stored in the output device 30 ready for further transmission. If, however, the message head is incorrect, the entire message can be rejected, without requiring any further processing.

If the message head is correct, the information element heads can be retrieved from the memory 24 and decoded in the decoding device 26, and the decoded information element heads, together with the associated undecoded information element bodies, are sorted into mandatory information elements and optional information elements, in step 55 of the procedure in FIG. 3. In step 56 of the procedure, it is first checked that all of the information element heads are correct, based on the standards set out in Chapters 5.6.6–5.6.7.1, 5.6.8.1 and 5.6.8.3 in the ITU-T Q.2931 protocol. Any incorrect information element heads, together with their associated bodies, can be removed. Following this, it is then checked that all mandatory information element heads are present. If any mandatory information element heads are not present, the entire message can be rejected.

If all of the mandatory information elements are present then, in step 57, the mandatory information element bodies are decoded in the decoding device 26. Then, in step 58, it is determined in the error checking device 28 whether all of the mandatory information element bodies are correct according to the standards defined in paragraphs 5.6.7.2 and 5.6.8.2 in the ITU-T Q.2931 protocol. Again, if they are not correct, the entire message can be rejected. If all of the mandatory information element bodies are found to be correct, then, in step 59, the decoding device 26 decodes the optional information element bodies and the message is processed further.

Thus, there is disclosed a procedure which allows incorrect messages to be dealt with in a particularly efficient way, by avoiding the need to decode the optional elements of such messages.

What is claimed is:

1. A method for processing a signalling message comprising at least one mandatory component and at least one optional component, each mandatory component comprising a message head and mandatory information elements, and the mandatory information elements comprising mandatory information element heads and mandatory information element bodies, the method comprising:

sorting the mandatory components into a message head and mandatory information elements;

decoding the message head;

checking the message head for errors;

only in the event that the message head is found not to contain any errors:
  decoding the mandatory information element heads;
  checking the mandatory information element heads for errors;

only in the event that the mandatory information element heads are found not to contain any errors:
  decoding the mandatory information element bodies; and
  checking the mandatory information element bodies for errors.

2. A method as claimed in claim 1, further comprising, only in the event that the mandatory information element heads are found not to contain any errors:

decoding the optional components.

3. A network node for an ATM network, the node comprising:

means for separating a received signalling message into mandatory and optional components, and means for sorting the mandatory components into a message head and mandatory information elements and for sorting the mandatory information elements into mandatory information element heads and mandatory information element bodies;

means for decoding a component of a received message;

means for checking for errors in the decoded component of the message; and means for processing the received message such that:
  the message head is sent to the means for decoding and the means for checking for errors;
  only in the event that the message head is found not to contain any errors, the mandatory information element heads are sent to the means for decoding and the means for checking for errors; and
  only in the event that the mandatory information element heads are found not to contain any errors, the mandatory information element bodies are sent to the means for decoding and the means for checking for errors.

4. A network node as claimed in claim 3, wherein, only in the event that the mandatory information element bodies are found not to contain any errors, the optional component of the message is sent to the means for decoding.

* * * * *